United States Patent [19]

Gryc et al.

[11] Patent Number: 5,343,905
[45] Date of Patent: Sep. 6, 1994

[54] VEHICULAR FUEL TANK VENT

[75] Inventors: William S. Gryc, Hartland; Chester Cox, Canton, both of Mich.

[73] Assignee: Ford Motor Company, Dearborn, Mich.

[21] Appl. No.: 72,026

[22] Filed: Jun. 7, 1993

[51] Int. Cl.⁵ .................................... B65B 31/00
[52] U.S. Cl. .................................. 141/59; 141/290; 137/587; 137/80; 220/86.2
[58] Field of Search ................ 137/583, 587, 588, 80, 137/79, 590, 590.5, 591, 592; 141/54, 59, 60, 61, 285, 290; 220/86.2, 4.14, 746, 202, 360, 205

[56] References Cited

U.S. PATENT DOCUMENTS

| | | | |
|---|---|---|---|
| 1,724,878 | 8/1929 | Jensen | 137/590 |
| 1,882,154 | 10/1932 | Mann et al. | 137/587 |
| 2,510,098 | 6/1950 | Geisler | 137/69 |
| 2,528,600 | 11/1950 | Lombard | 137/69 |
| 3,672,537 | 6/1972 | Kitzner | 220/746 |
| 3,804,291 | 4/1974 | Fricker | 220/86.2 |
| 3,983,891 | 10/1976 | Shoemaker | 137/43 |
| 4,166,550 | 9/1979 | Kleinshcmitt et al. | 220/86.2 |
| 4,261,477 | 4/1981 | Casimir et al. | 220/86.2 |
| 4,666,058 | 5/1987 | Harris | 220/373 |
| 4,714,171 | 12/1987 | Sasaki et al. | 220/86.2 |
| 4,836,402 | 6/1989 | Sasaki | 220/86.2 |
| 4,958,655 | 9/1990 | Danek | 137/80 |

Primary Examiner—Henry J. Recla
Assistant Examiner—Steven O. Douglas
Attorney, Agent, or Firm—Jerome R. Drouillard; Roger L. May

[57] ABSTRACT

An automotive type fuel tank has a fuel fill pipe with automatic pressure responsive fuel shutoff means, and a vapor vent assembly. The assembly has a small tube extending down through the top of the tank to below the normal fuel level of a full tank. The lower end is upturned and extends upwardly to a point near the top of the tank with a large orifice opening to vent vapors freely therethrough through the tube. A small orifice is drilled in the bottom of the tube at the bend to slowly bleed fuel into the tube as the tank fills until the fuel level blocks the vent of fuel vapors, resulting in a shutoff of the fill fuel. During operations other than filling, the small orifice prevents/minimizes expulsion of liquid fuel out the vent tube. A weighted ball further seals against fuel leakage upon vehicle or tank rollover.

6 Claims, 2 Drawing Sheets

VEHICULAR FUEL TANK VENT

FIELD OF THE INVENTION

This invention relates in general to an automotive type fuel tank. More particularly, it relates to a vapor vent assembly for such a tank that controls the fill level as well as minimizing liquid fuel expulsion upon removal of the cap subsequent to a temperature expansion of the fuel, or upon rollover of the vehicle.

BACKGROUND OF THE INVENTION

Many vehicular fuel tanks have a vapor vent consisting simply of a small tube pushed through the top of the tank to project downwardly into the tank to the desired fuel fill level, at which point the tube is simply cut off flush. With this type of construction, the tank will vent vapors until the fuel level reaches the bottom of the tube, at which point the vent becomes blocked and the resulting pressure buildup in the fuel pipe shuts off the fuel nozzle in a known manner. Neither liquid fuel nor fuel vapors can now vent, and the fill level of the fuel is fixed. Expansion of the fuel due to a temperature rise now could cause liquid fuel to be expelled out the fill pipe if the cap is suddenly removed, which would be undesirable.

Other constructions have a vapor vent that is located near the top of the tank above the normal fuel level that is maintained open at all times, and depend upon some other device external to the vapor vent assembly to control the fill level of the fuel.

The invention provides a vapor vent assembly that in itself controls the fill level of the tank to the proper level that can be higher than the bottom of the vent assembly, and also provides means to minimize any expulsion of liquid fuel out of the fill pipe upon removal of the cap after a temperature rise expansion of the fuel or rollover of the vehicle/tank.

DESCRIPTION OF THE PRIOR ART

U.S. Pat. No. 3,804,291, Fricker, shows a fuel tank with a stepped-shaped air pressure expansion chamber 5 inside the tank secured near the top, the chamber 5 being closed except for a small fuel opening 8 at the bottom and a labyrinthian-like inlet at the top. The main tank fuel can only escape by way of the channel 12 and aperture 21 (FIG. 3) into the dome 9 and out annulus 18 to channel 10 and vent line 17, which is always open. The maximum fill line is at 4. Larger volumes 19,20 maintain an air pressure expansion volume above the normal level of the fuel to minimize escape of fuel from container 5 through the funnel 15. The opening 8 and annulus 18 minimize large fuel volume expulsion. However, if the fuel level reaches the dome 9, then a much greater volume can be expelled. Furthermore, there is no internal fuel fill control, the only indication of the tank being filled being when the fuel spills out the bottom edge of the nearly horizontally positioned fill inlet 2. Also, there is no protection against fuel spillage due to vehicle rollover.

U.S. Pat. No. 1,724,878, Jensen, and U.S. Pat. No. 2,510,098, Geisler, are essentially merely rollover devices, each including ball valves for venting as well as controlling rollover fuel spillage. Venting and filling is stopped when the vent is covered with fuel.

SUMMARY OF THE INVENTION

The invention provides a fuel tank constructed with a large diameter fill pipe adapted to receive therein a conventional fuel nozzle for filling the tank, the nozzle being of the pressure responsive type that automatically shuts off above a predetermined tank pressure rise. The tank also includes a vapor vent assembly consisting of a small diameter J or U shaped tube inserted through the top of the tank to project into the tank to a point below the desired fill level height. The lower end of the tube is upturned or bent back upon itself to form an upwardly facing inlet opening or orifice of rather large cross sectional area near the top of the tank and above the normal level of the fuel into which fuel vapors/air pressure can pass freely out through the tube. The upper end of the tube is connected to the fill pipe just below a pressure relief type cap that conventionally closes the fill pipe to equalize the pressures between the fill pipe and vent tube and route the vapors to the space below the cap.

The base portion of the vent tube, or the point at which the tube is upturned, is drilled with a hole or orifice of very small cross sectional area through which fuel can seep as the fuel level rises upon filling of the tank. The rate of fuel rise inside the tube corresponds to the rate of rise of the fuel inside the tank itself at the maximum desired refueling fill rate so that the proper fill height above the bottom of the vent tube is attained. Once the fuel rising inside the tube reaches the level that blocks exit of the vapors to the outlet of the tube, then the immediate pressure rise in the tank causes the fuel nozzle to shut off, with the fuel level at the desired height.

Once the tank has been filled and the cap replaced, then the smallness of the orifice in the tube becomes the control to prevent or minimize expulsion of liquid fuel out the vapor tube and fill pipe if the cap is removed subsequent to a buildup of vapor pressure in the tank due to expansion of the fuel resulting from a hot soak or other temperature rise of the fuel.

It is, therefore, a primary object of the invention to provide a fuel tank with a vent line or tube assembly that is simple in construction, operates in itself to control the fill height of the fuel, and minimizes or prevents the expulsion of liquid fuel out of the fill pipe when uncapping a full tank under pressure or during a vehicular rollover.

DESCRIPTION OF THE PREFERRED EMBODIMENTS

Figure 1:
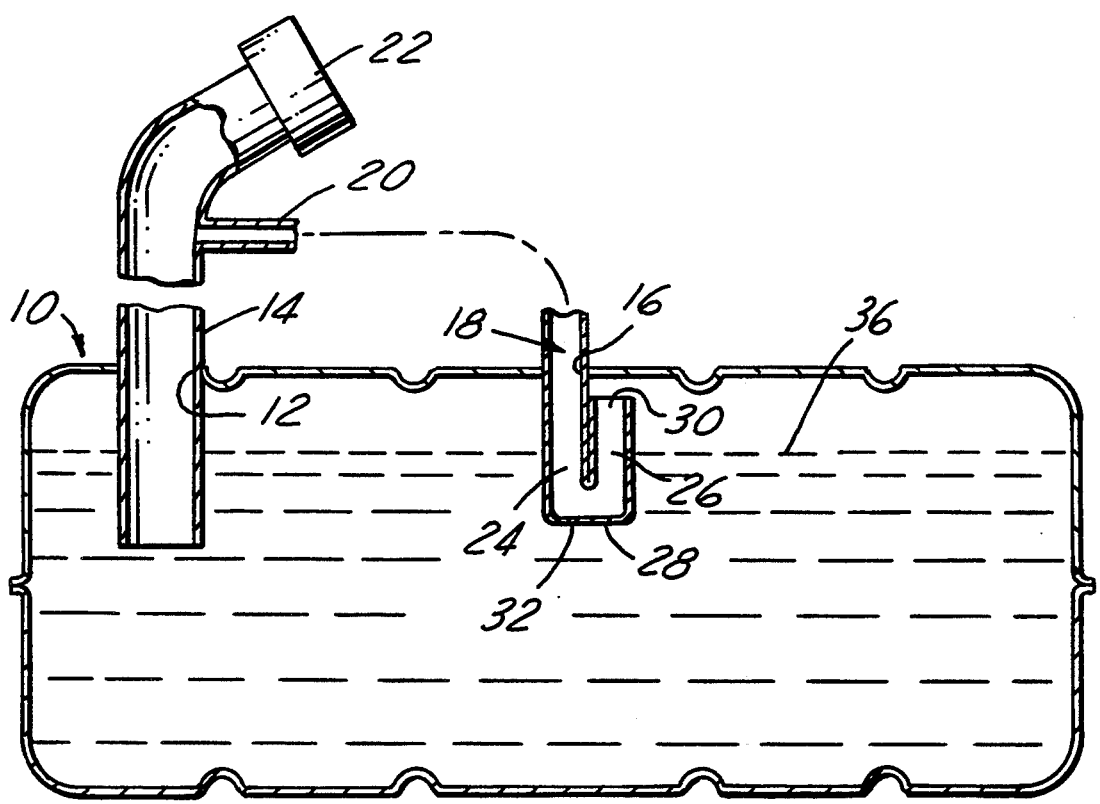
FIG. 1 is a cross-sectional view of a fuel tank embodying the invention.

FIG. 1 shows schematically an automotive type hollow fuel tank 10 with a first opening 12 for receiving therethrough a large diameter conventional fuel fill pipe 14. The details of construction and operation of the mechanisms within the pipe are not given since they are known and believed to be unnecessary for an understanding of the invention. Suffice it to say that the pipe would contain the usual flap door assembly to allow the entry only of an unleaded fuel nozzle, together with other means, such as a check valve, to prevent backflow of liquid or vapors once the nozzle is removed and the cap replaced. The cap itself could be of the pressure relief type, and the fuel nozzle of the type that automatically shuts off in response to a predetermined tank vapor pressure.

Figure 2B:
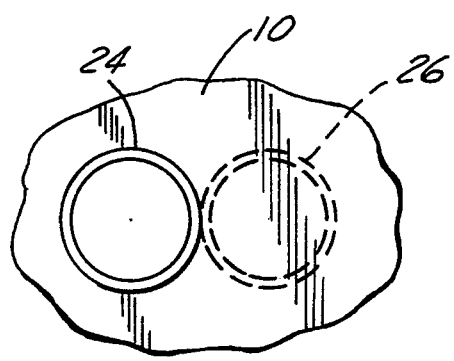
FIG. 2B is a top view of the FIG. 2A embodiment.
Figure 2A:
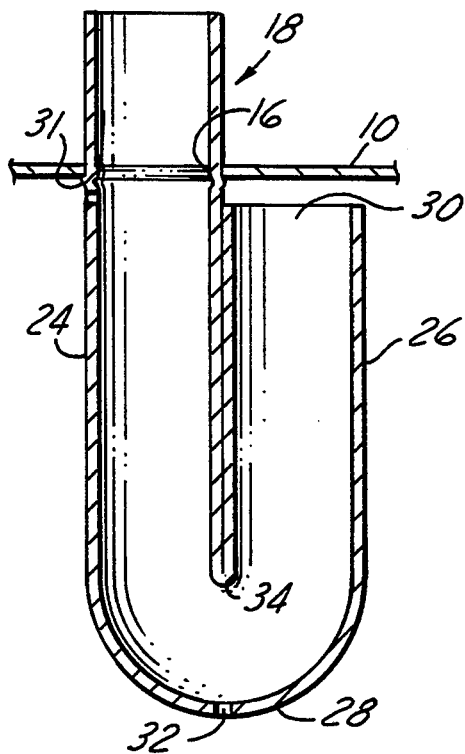
FIG. 2A is an enlarged cross-sectional view of a detail of FIG. 1.

Referring to FIGS. 2A and 2B as well as FIG. 1, the fuel tank contains a second opening 16 that receives therethrough a small diameter vent tube 18 that projects down into the tank to a location or point below the desired fuel fill height or level. The upper end 20 of the tube (FIG. 1) is connected as shown to fill pipe 14 at a point just below cap 22 and above the check valve flow back prevention means of the fill pipe.

Vent tube 18 is shown as having essentially a tubular J shape in cross-section, with parallel long and short leg or arm portions 24 and 26 extending in opposite directions and interconnected by an arcuate base portion 28. The short leg portion 26 extends vertically upwardly above the normal fill height of the liquid and to a point close to the tank upper surface, but with a sufficient gap to maintain necessary air flow. At that point, it has an open end of large cross-section constituting a large orifice 30 for the relatively unrestricted entry thereinto of fuel vapors/air for passage/vent through the tube out to the cap area. Also shown in FIG. 2A is a vapor bleed port 31 that allows the pressure in the top of the tank and whatever pressure is at the top of the fuel column just below the cap to equalize to prevent the possibility of a column of fuel being pushed up the fill pipe.

The base portion 28 has a small orifice 32 that allows fuel to slowly seep into the vent tube as the tank is being filled, and controls the fill height of the fuel by essentially blocking off the escape of fuel vapors through the vent tube. More specifically, during a refuelling operation with a fuel nozzle inserted into the fill pipe, when the fuel level in the tube 18 rises to a point where it is above the dividing portion 34 between the two leg portions of the tube, then the vapors are blocked from communicating with the outlet portion 20 of the tube and a vapor pressure surge inside the tank and fill pipe will occur. This will trigger the mechanism in the fuel nozzle to shut off fuel flow through the nozzle, and the level of fuel in the tank will be established.

Orifice 32 will be sized so that the rate of rise of the fuel in the tube 18 will keep pace with the rate of rise of fuel inside the main tank 10 at the maximum desired refuelling fill rate so that the fuel will be at the proper level. This can be as shown above the base portion of the tube, as indicated by the fuel line 36.

Small orifice 32 could be, for example, say fifty times smaller than the restriction encountered by the vapor flowing through the larger orifice 30 so that there would be very little opposition to vent of the vapors as compared to flow of liquid fuel through the orifice 32. In addition, the different density of liquid versus vapor also significantly contributes to the effectiveness of the invention, the less dense vapor being discharged much more efficiently.

This large restriction to flow of fuel through the small orifice 32 provides a second function of protecting against fuel expulsion or liquid loss when uncapping a full tank under high vapor pressure. In this case, assume that the tank vapor pressure increases because of hot fuel expansion, and that the cap is removed. Fuel will not be expelled out of the fill pipe since it has a check valve to prevent this. Ordinarily, fuel could be expelled out of a conventional vent pipe. However, with the small orifice 32, the rate of flow is so restricted and controlled that it prevents or minimizes such an occurrence.

When the fuel level in the tank drops to a point where the bottom of the vent tube is again uncovered enough to permit free venting of the fuel vapors, then the vapors/air will be displaced out through the line 20 to the space in the filler neck below the cap 22. If the pressure exceeds the set value of the cap relief valve at any time, then it will open and release the vapors and excess pressure. No liquid fuel will be expelled if the cap were removed because of the slow rate of flow through the orifice 32. The total effect of this construction greatly favors reduction of tank vapor pressure with minimal loss of liquid fuel.

Figure 3B:
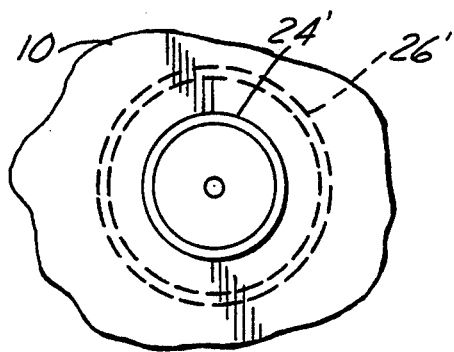
FIG. 3B is a top view of the FIG. 3A embodiment.
Figure 3A:
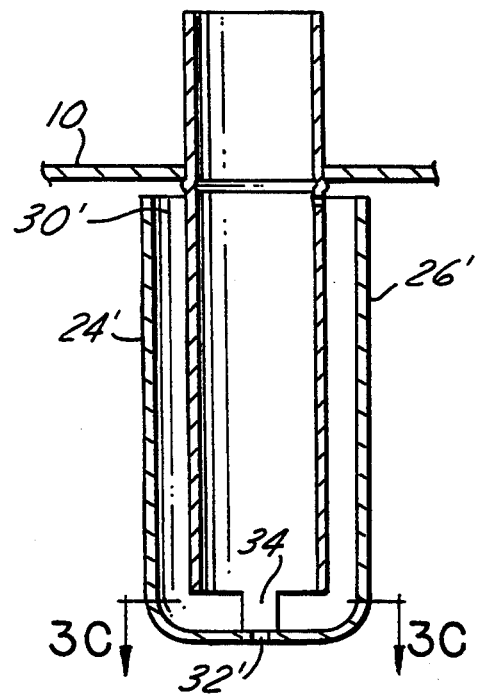
FIG. 3A is a cross-sectional view of an alternative construction to that of FIG. 2A.
Figure 3C:
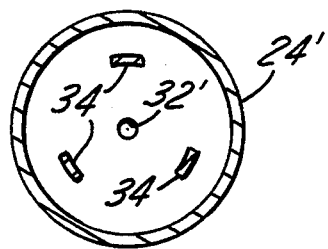
FIG. 3C is a cross-sectional view taken on a plane indicated by and viewed in the direction of the arrows 3C—3C in FIG. 3A.

FIGS. 3A, 3B and 3C illustrate an alternative embodiment. In this case, the long and short leg portions 24' and 26' of the vent tube are concentric, with the large orifice 30' being defined by the large outer annulus, and the smaller orifice 32' in the bottom. FIG. 3C shows the inner tube being exposed vertically from the outer tube 24' by three circumferentially separated supports 34.

Figure 4:
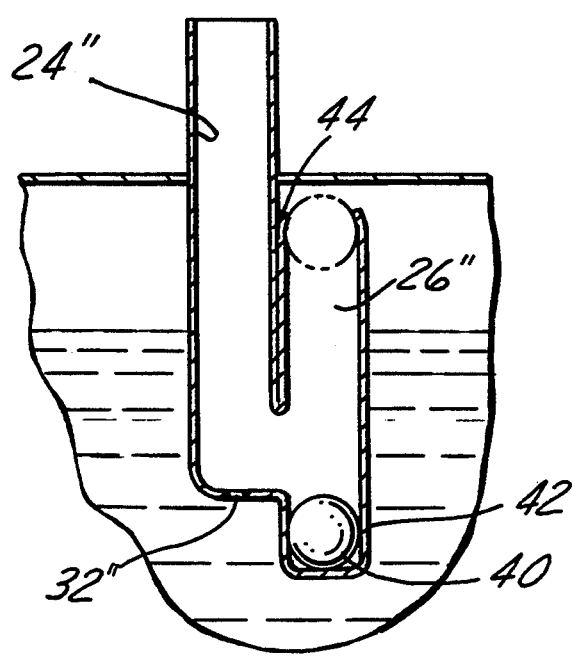
FIG. 4 is a cross-sectional view of a further embodiment of the invention.

FIG. 4 illustrates a further embodiment in which a weighted ball 40 is included in an extended pocket-like portion 42 of the short leg portion 26''. The ball is freely movable to the upper end of leg portion 26'' to seal the large orifice upon vehicle rollover to prevent spillage of liquid fuel from the tank to the vent pipe. The upper open end of the short portion has a turned edge 44 to seal ball 40. Although not shown, the small orifice 32'' also could be sealed if desired by a needle valve or the like for total protection. Ball 40 could also be positioned below tube element 24'' which directly exits the tank and the small orifice 32'' placed in tube element 26'' for total protection.

From the foregoing, it will be seen that the invention provides a fuel tank vapor vent assembly that controls the fill level of the tank to the proper height, prevents or minimizes the expulsion of liquid fuel out through the filler neck of the fill pipe if the cap is removed from a full tank with high vapor pressure, and seals the tank and vapor vent against leakage of fuel in the event of a vehicle rollover.

While the invention has been shown and described in its preferred embodiments, it will be clear to those skilled in the arts to which it pertains that many changes and modifications may be made thereto without departing from the scope of the invention.

We claim:

1. A vapor vent for a vehicular type fuel tank having a large diameter capped fuel inlet pipe projecting through the top of the tank for receiving fuel therethrough upon insertion of a fuel nozzle into the inlet pipe, the pipe having a pressure relief cap covering the same, the nozzle being responsive to a predetermined air/vapor pressure buildup in the tank against the nozzle for terminating fuel flow from the nozzle, the tank having a small diameter vapor vent tube extending from inside to outside the tank for connection with said fill pipe, the tube being bent back upon itself within the tank to define a second portion extending vertically towards the top of the tank to a point above a normal fuel level in the tank and providing an opening at the end of the tube for the passage of fuel vapors/air thereinto and for venting the same, and an opening of smaller cross-section in the tube at the base point of joinder of the two portions for receiving fuel therethrough at times only slowly, the smaller opening upon removal of the cap minimizing fuel expulsion through the tube as a result of a rise in tank fuel pressure conditions above a predetermined level.

2. A vapor vent as in claim 1, wherein the vent tube has a J shape having a base portion connecting parallel long and short leg portions.

3. A vapor vent as in claim 1, including weighted means adjacent the intake opening of the tube operably movable upon rollover of the tank to close the intake opening to prevent fuel loss therethrough.

4. A vapor vent as in claim 1, wherein the vent pipe consists of a pair of concentric inner and outer long and short tubes, the outer tube being closed at one end and open at its upper end to the vapors adjacent the top of the tank, the inner tube at one end extending up through the tank with its other end adjacent the closed end of the outer tube for the passage of vapors from the outer tube to the inner tube, the small orifice being through the closed end of the outer tube.

5. An automotive fuel tank vapor vent system having means associated with a normally capped fuel fill pipe that is sensitive to a predetermined fuel fill pipe and tank pressure during fuel filling to terminate the filling of said tank, the vapor vent including a vent pipe extending essentially vertically through the top of the tank for connection to the fill pipe below the cap for the expulsion of tank air/fuel vapors under pressure, the vent pipe having essentially a tubular U shaped path to provide an upwardly facing inlet opening adjacent the top of the tank above a normal fill level of the tank, the inlet opening having a relatively large cross-sectional area for the essentially unrestricted vent of air/vapors thereinto, the vent pipe further including a base portion having an orifice type fuel bleed opening of relatively small cross-sectional area permitting only a slow egress of fuel therethrough into the vent pipe, the flow of air/vapors through the pipe being blocked upon the fuel rising in the pipe sufficiently to cover the base portion and prevent communication of vapors through the vent pipe, the rate of rise of fuel in the vent pipe essentially matching the rate of rise of fuel in the tank during the filling of said tank whereby blocking of the vent pipe with fuel causes the tank pressure to increase to the predetermined level to terminate fuel filling of the tank.

6. A vehicular type fuel tank consisting of a closed tank with a fuel fill pipe extending thereinto, the fill pipe receiving a fuel nozzle thereinto for filling the tank, the nozzle being responsive to a predetermined tank pressure for automatically terminating fill flow into said tank, and a vapor vent pipe extending out of the tank into connection with said fill pipe for the venting of fuel vapors therefrom, the vent pipe being essentially J shaped with two essentially parallel upwardly opening leg portions connected by an arcuate base portion, one leg portion terminating adjacent the top of the tank with an upwardly facing large cross-sectional opening for the relatively unrestricted vent of fuel vapors thereinto, the base portion having a fuel bleed orifice of small cross-section for the slow bleed of fuel into the vent pipe as the fuel level rises during filling, the vent being closed upon the rise of fuel in the vent pipe to a level blocking the communication of vapors from the one leg to the other, the blockage of vapors venting increasing the tank pressure upon continued filling to the predetermined pressure level effective to terminate further tank filling through the nozzle, the orifice further preventing the rapid expulsion of fuel through the vent pipe upon removal of the cap subsequent to a temperature rise expansion of the fuel and a rise in the tank pressure.

* * * * *